United States Patent
Niu et al.

(10) Patent No.: US 11,861,080 B2
(45) Date of Patent: Jan. 2, 2024

(54) METHOD FOR UNLOCKING BY MEANS OF KNOB, ELECTRONIC DEVICE, AND READABLE STORAGE MEDIUM

(71) Applicant: GUANGDONG COROS SPORTS TECHNOLOGY JOINT STOCK COMPANY, Guangdong (CN)

(72) Inventors: Haotian Niu, Guangdong (CN); Yu Tang, Guangdong (CN); Guofeng Yang, Guangdong (CN)

(73) Assignee: GUANGDONG COROS SPORTS TECHNOLOGY JOINT STOCK COMPANY, Guangdong (CN)

( * ) Notice: Subject to any disclaimer, the term of this patent is extended or adjusted under 35 U.S.C. 154(b) by 55 days.

(21) Appl. No.: 17/631,706

(22) PCT Filed: Jul. 31, 2019

(86) PCT No.: PCT/CN2019/098527
§ 371 (c)(1),
(2) Date: Jan. 31, 2022

(87) PCT Pub. No.: WO2021/016908
PCT Pub. Date: Feb. 4, 2021

(65) Prior Publication Data
US 2022/0269355 A1   Aug. 25, 2022

(51) Int. Cl.
*G06F 3/0362* (2013.01)
*G04G 21/00* (2010.01)
*G06F 9/4401* (2018.01)

(52) U.S. Cl.
CPC ........... *G06F 3/0362* (2013.01); *G04G 21/00* (2013.01); *G06F 9/4418* (2013.01)

(58) Field of Classification Search
CPC ....... G06F 3/0362; G06F 3/048–04897; G06F 9/4418; G04G 21/00
See application file for complete search history.

(56) References Cited

U.S. PATENT DOCUMENTS

2016/0370181 A1* 12/2016 Yong ..................... G06F 3/0338
2018/0248990 A1*  8/2018 Jung ....................... G06F 1/163

FOREIGN PATENT DOCUMENTS

| CN | 105068412 | 11/2015 |
| CN | 105117013 | 12/2015 |

(Continued)

OTHER PUBLICATIONS

PCT/CN2019/098527 International Search Report dated Apr. 21, 2020.

(Continued)

*Primary Examiner* — Hang Lin
(74) *Attorney, Agent, or Firm* — Michael Best & Friedrich LLP

(57) ABSTRACT

Provided is a method for unlocking by use of a knob. The method is applied to an electronic device provided with an operation knob. The method includes the following steps: detecting (1) an action of the operation knob in a screen locked state in real time; and starting (2) an unlocking program in response to rotation of the operation knob: calculating the rotational circumferential distance of the operation knob along the current rotational direction, determining whether the rotational circumferential distance of the operation knob reaches a preset circumferential distance, controlling the electronic device to unlock in response to the rotational circumferential distance of the operation knob reaching the preset circumferential distance, and unlocking failed and returning to step (1) in response to the rotational circumferential distance of the operation knob not reaching the preset circumferential distance.

18 Claims, 10 Drawing Sheets

(56) References Cited

FOREIGN PATENT DOCUMENTS

| | | |
|---|---|---|
| CN | 106682465 | 5/2017 |
| CN | 107636560 | 1/2018 |
| CN | 107710135 | 2/2018 |
| EP | 2733598 A2 | 5/2014 |

OTHER PUBLICATIONS

European Patent Office Extended Search Report for Application No. 19939101.2 dated Jan. 9, 2023 (8 pages).

* cited by examiner

METHOD FOR UNLOCKING BY MEANS OF KNOB, ELECTRONIC DEVICE, AND READABLE STORAGE MEDIUM

CROSS-REFERENCE TO RELATED APPLICATIONS

This is a National Stage Application filed under 35 U.S.C. 371 based on International Patent Application No. PCT/CN2019/098527, filed on Jul. 31, 2019.

TECHNICAL FIELD

The present application relates to the method for controlling an electronic device and, in particular, to an unlocking method for an electronic device.

BACKGROUND

When a sports watch is worn and used, a misoperation easily occurs due to an unintentional press on a button of the watch by a wrist. Therefore, most sports watches are provided with the function of "interface operation lock", that is, the button of a watch is controlled to be unresponsive by software after the watch has not been used for a period of time, and the watch needs to be "unlocked" by special "long press on a button" or "press on a combination of buttons" before functioning normally. As a result, the watch is time-consuming and laborious when being used.

Disadvantages of the interactive mode of "long press for unlocking" of mainstream sports watches: The long press usually takes 2 seconds, which is time-consuming and laborious and cannot completely avoid wrong unlocking caused by a press by a wrist. In the present application, the time required for unlocking by continuously turning a knob is 0.5 seconds, and the action is continuous and smooth. In this manner, the wrong unlocking caused by other actions by a wrist can be completely avoided.

Disadvantages of the mode of "press on a combination of buttons for unlocking" of the mainstream watches: Two certain buttons are simultaneously pressed for unlocking, and the positions of the two certain buttons are difficult to remember, and accurate operation synchronization of two fingers of a user is required, and thereby the unlocking is highly probably not successful.

Similar to sports watches, other electronic devices also have such common unlocking methods as the preceding long press for unlocking and press on a combination of buttons for unlocking. Additionally, sometimes the unlocking methods also include unlocking on a touchscreen. Such an operation needs to first lighten the screen of an electronic device and then perform the touch operation on the screen. The operation is complex.

SUMMARY

An object of the present application is to provide an unlocking method by using a knob. The method is configured to unlock an electronic device by using an operation knob on the electronic device. The method is easily operable, time-saving and labor-saving.

To implement the preceding object, the present application provides an unlocking method by using a knob, and the method is applicable to an electronic device. An operation knob is provided on the electronic device. The method includes the following steps. In step (1), an action of the operation knob in a screen locked state in real time is detected and in step (2) an unlocking program in response to rotation of the operation knob is started and the unlocking program includes: calculating a rotational circumferential distance of the operation knob along a current rotational direction; determining whether the rotational circumferential distance of the operation knob reaches a preset circumferential distance; controlling the electronic device to unlock in response to the rotational circumferential distance of the operation knob reaching the preset circumferential distance; or unlocking failed and returning to step (1) in response to the rotational circumferential distance of the operation knob not reaching the preset circumferential distance.

Compared with the related art, in the present application, the electronic device is unlocked by using the circumferential distance rotated by the physical operation knob so that the unlocking operation on a screen or press for a certain time or press on multiple buttons become unnecessary. In the present application, the unlocking by continuously turning the operation knob needs operation of only one single finger. The method is easily operable, time-saving and labor-saving.

In an embodiment, step (1) specifically includes the following steps: acquiring a rotational direction of the operation knob and a rotational angular velocity of the operation knob in the screen locked state in real time. In step (2), the unlocking program is started in response to the rotational direction of the operation knob and/or the rotational angular velocity of the operation knob meeting a preset range.

In an embodiment, a specific condition for starting the unlocking program includes one of: in response to the rotational angular velocity exceeding a preset velocity, starting the unlocking program, and regarding a current rotational direction as a valid rotational direction; in response to the rotational direction of the operation knob being a preset valid rotational direction, starting the unlocking program; or in response to the rotational direction of the operation knob being the preset valid rotational direction and the rotational angular velocity exceeding the preset velocity, starting the unlocking program.

In an embodiment, starting the unlocking program includes the following steps: calculating a rotational circumferential distance of continuous rotation along the valid rotational direction, regarding the rotational circumferential distance of the continuous rotation along the valid rotational direction as a valid rotational circumferential distance, determining whether the valid rotational circumferential distance reaches the preset circumferential distance, controlling the electronic device to be unlocked in response to the valid rotational circumferential distance reaching the preset circumferential distance, and returning to step (1) in response to the valid rotational circumferential distance not reaching the preset circumferential distance.

In an embodiment, the valid rotational circumferential distance is determined by one of: calculating a rotational circumferential distance of continuous rotation at a velocity greater than the preset velocity along a current valid rotational direction and regarding the rotational circumferential distance of the continuous rotation at the velocity greater than the preset velocity along the current valid rotational direction as the valid rotational circumferential distance;

regarding a rotational circumferential distance of rotation along the current valid rotational direction within a preset time after the unlocking program is started as the valid rotational circumferential distance, wherein the rotational angular velocity exceeds the preset velocity; regarding a rotational circumferential distance of rotation along the current valid rotational direction after the unlocking program is started as the valid rotational circumferential distance, wherein the rotational angular velocity exceeds the preset velocity, and a halt time of the rotation does not exceed a preset halt time; regarding a rotational circumferential distance of rotation along the current valid rotational direction after the unlocking program is started as the valid rotational circumferential distance, wherein the a halt time of the rotation does not exceed the preset halt time; or regarding a rotational circumferential distance of rotation along the current valid rotational direction within a preset time after the unlocking program is started as the valid rotational circumferential distance.

In an embodiment, the rotational direction of the operation knob and the rotational angular velocity of the operation knob are acquired by using a photosensor, and the rotational circumferential distance of the operation knob is calculated according to the rotational direction, a rotational duration and the rotational angular velocity. The rotational angular velocity of the operation knob is converted to photoelectronic signals by using the photosensor, and whether to perform an unlocking operation is determined by identifying a rotational "direction" of a knob, a rotational "angular velocity" of the knob and a rotational "circumferential distance" of the knob.

In an embodiment, the photosensor includes a laser light source unit and an image detection unit. The laser light source unit is configured to emit weak laser light on a surface of the operation knob, and the image detection unit is configured to determine the rotational direction of the operation knob and the rotational angular velocity of the operation knob by using light reflected by the surface of the operation knob.

In an embodiment, step (2) that the starting an unlocking program further includes: displaying an unlock picture on a screen of the electronic device, where the unlock picture includes an arced progress bar corresponding to the preset circumferential distance; synchronously filling the progress bar according to the rotational direction of the operation knob and the rotational angular velocity of the operation knob, and canceling the unlock picture in response to an unlocking failure. In the present application, while the unlocking operation is performed, a user is guided to use the method in conjunction with the unlocking animation displayed on the screen. Thus, the method is simple and easy to use.

In an embodiment, an unlock pattern is also displayed at an end of the arced progress bar.

In an embodiment, after the electronic device is unlocked, a rotation signal of the operation knob detected within a preset time after the electronic device is unlocked is omitted, or rotational signals of the operation knob are omitted for preset first several times.

In an embodiment, the electronic device is a watch, a camera, a walkman or a recording device.

In an embodiment, the electronic device is a watch, and the operation knob is a crown of the watch or a bezel disposed around a dial of the watch.

The present application further provides an electronic device capable of being unlocked by using a knob. The electronic device includes a host, an operation knob rotatably mounted on the host, one or more processors, a memory, and one or more programs. The one or more programs are stored in the memory and configured to be executed by the one or more processors, and the one or more programs include instructions for executing the preceding unlocking method by using a knob.

The present application further provides a non-transitory computer-readable storage medium including a computer program used in conjunction with an electronic device having an operation knob. The computer program is executable by a processor to cause the processor to implement the preceding method for unlocking by using a knob.

DETAILED DESCRIPTION

To explain in detail the technical content, the structural features, the achieved purposes and the achieved effects of the present application, the descriptions are given in conjunction with embodiments and drawings.

Figure 1:
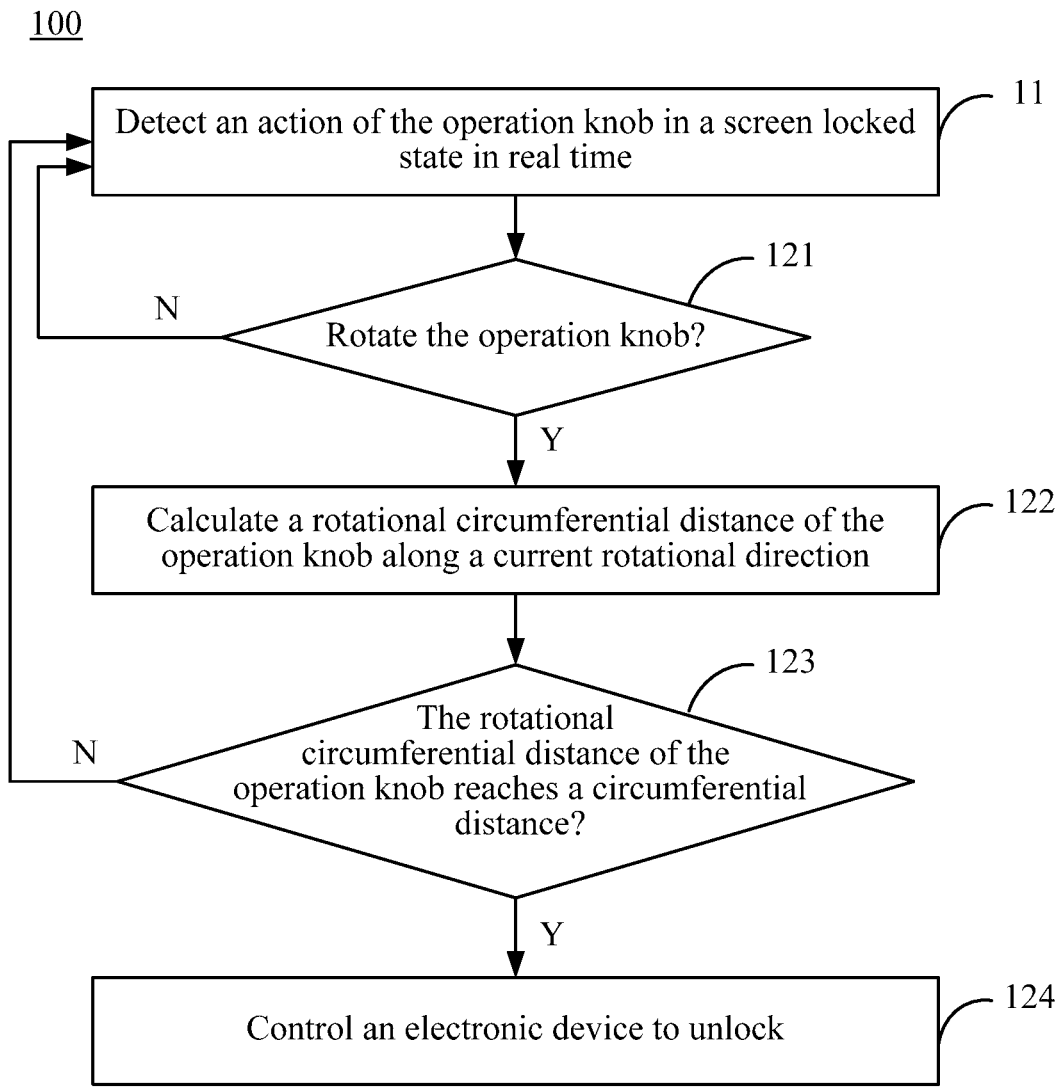
FIG. 1 is a flowchart of an unlocking method by using a knob according to embodiment one of the present application.

Referring to FIG. 1, in embodiment one, the present application provides an unlocking method 100 by using a knob. The method is applied to an electronic device provided with an operation knob. The method 100 includes the following steps: detecting (11) an action of the operation knob in a screen locked state in real time; and starting (121) an unlocking program in response to rotation of the operation knob: calculating (122) a rotational circumferential distance of the operation knob, determining (123) whether the rotational circumferential distance of the operation knob reaches a preset circumferential distance, controlling (124) the electronic device to be unlocked in response to the rotational circumferential distance of the operation knob reaching the preset circumferential distance, and unlocking failed and returning to step (1) in response to the rotational circumferential distance of the operation knob not reaching the preset circumferential distance.

In an embodiment, a rotational direction of the operation knob and a rotational angular velocity of the operation knob are acquired by using a photosensor, and the rotational circumferential distance of the operation knob is calculated according to the rotational direction, a rotational duration and the rotational angular velocity.

In an embodiment, the photosensor includes a laser light source unit and an image detection unit. The laser light source unit is configured to emit weak laser light on a surface of the operation knob, and the image detection unit is configured to determine the rotational direction of the operation knob and the rotational angular velocity of the operation knob according to light reflected by the surface of the operation knob.

Figure 7A:
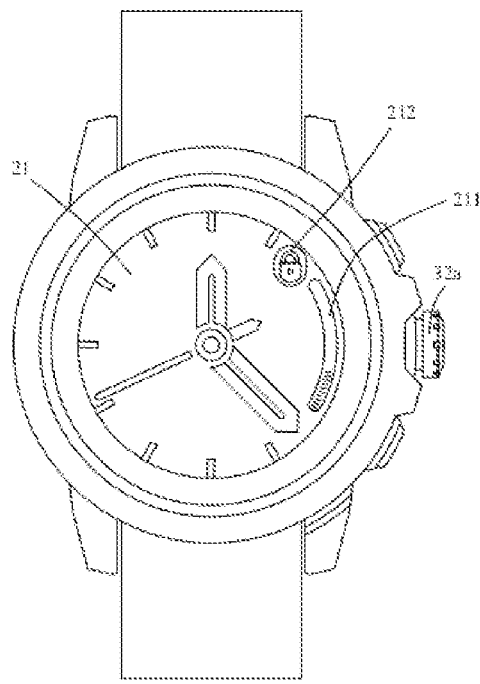
FIGS. 7a to 7c are views illustrating unlocking of an ordinary watch.
Figure 7B:
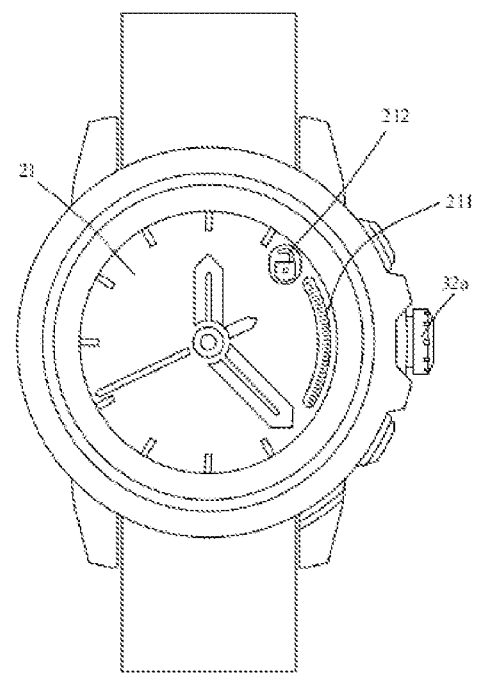
Figure 7C:
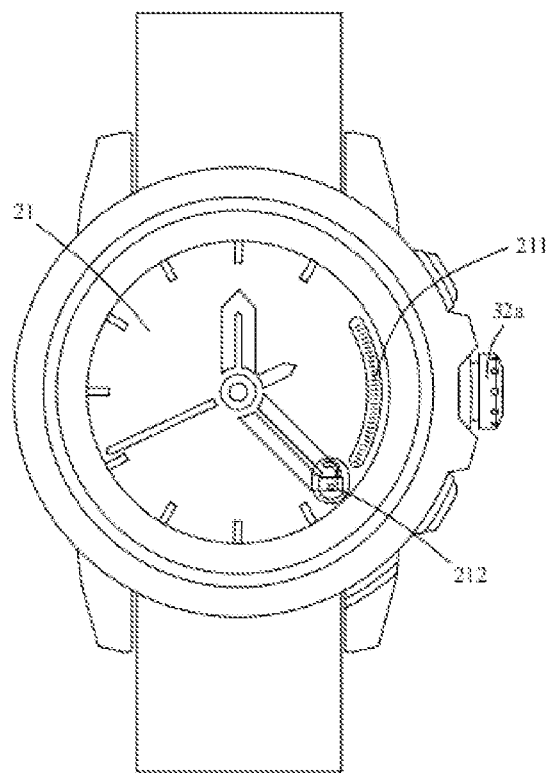

In an embodiment, referring to FIGS. 7a to 7c, starting an unlocking program also includes the following steps: playing (125) an unlock picture 21 on a screen of the electronic device, where the unlock picture 21 includes an arced progress bar 211 corresponding to the preset circumferential distance; synchronously filling the progress bar according to the rotational direction of the operation knob and the rotational angular velocity of the operation knob; and canceling the unlock picture in response to an unlocking failure. In an embodiment, an unlock pattern 212 is also displayed at an end of the arced progress bar. When the rotational circumferential distance reaches the preset circumferential distance, and the progress bar 211 is full (as shown in FIG. 7b), an unlock icon is displayed in the unlock pattern 212, and the electronic device is unlocked. When the progress bar 211 is not full (as shown in FIG. 7a), a lock icon is displayed in the unlock pattern 212, and the electronic device remains in a locked state. The filling direction of the progress bar 211 is determined by the rotational direction of the current operation knob. For example, in FIGS. 7a and 7b, the current operation knob is rotated clockwise for unlocking, and in FIG. 7c, the current operation knob is rotated anticlockwise for unlocking.

In an embodiment, after the electronic device is unlocked (124), a rotation signal of the operation knob detected within a preset time after the electronic device is unlocked is omitted, or rotation signals of the operation knob are omitted for preset first several times. A rotation instruction of the operation knob after the electronic device is unlocked is abandoned under the control of software so that such operations as the turn on the interface caused by a misoperation when the electronic device is in an unlocked state are prevented. In this embodiment, the system abandons (omits) the turn (rotation) instruction of the first operation knob and the turn (rotation) instruction of the second operation knob and responds to the turn (rotation) instruction of the third operation knob.

Figure 2:
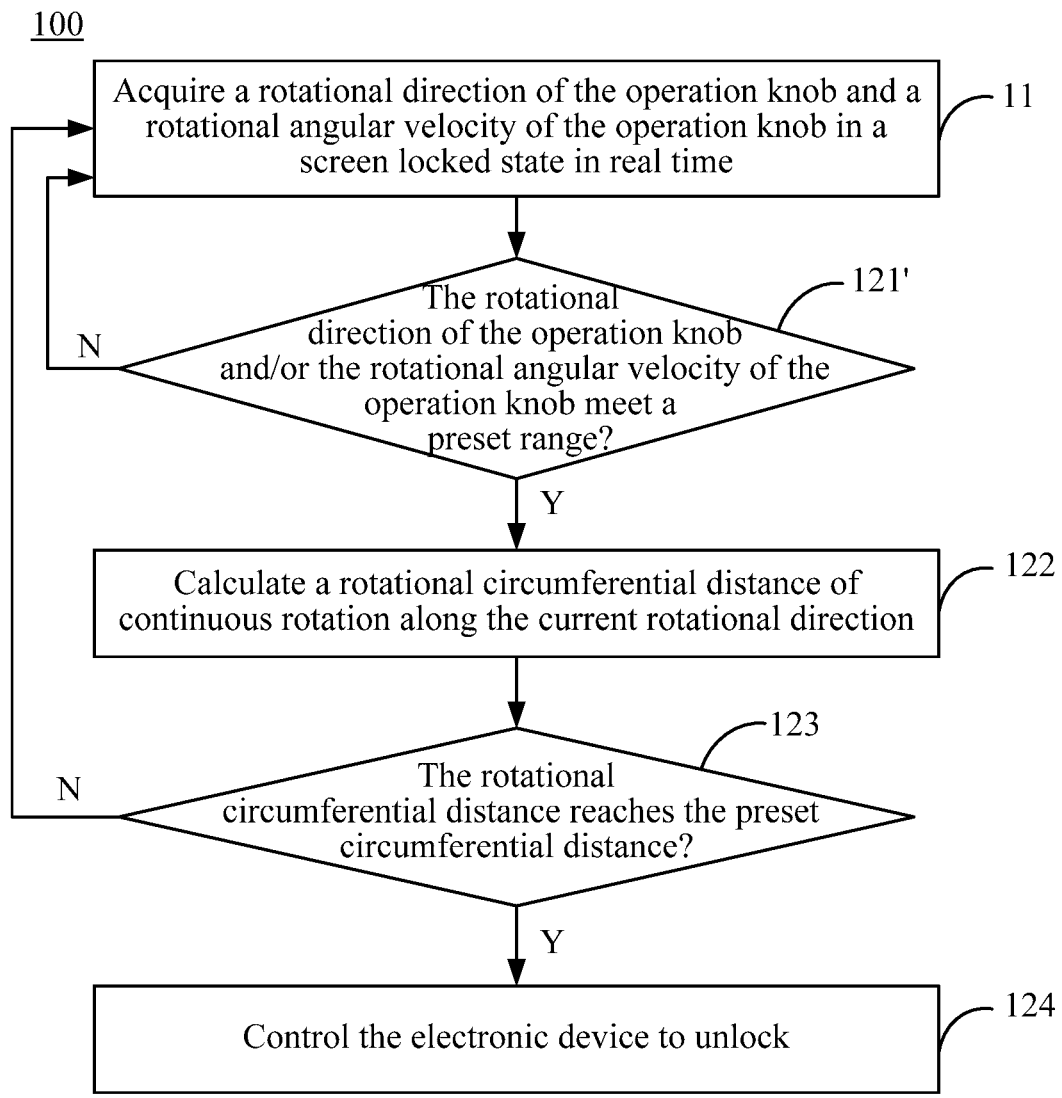
FIG. 2 is a flowchart of an unlocking method by using a knob according to embodiment two of the present application.

Referring to FIG. 2, based on the embodiment one, in embodiment two, step (11) specifically includes: acquiring the rotational direction of the operation knob and the rotational angular velocity of the operation knob in the screen locked state in real time. In step (121'), when the rotational direction of the operation knob and/or the rotational angular velocity of the operation knob reaches a present range, the unlocking program is started (M). In step (121'), a valid rotational direction is configured, or a preset valid rotational direction is acquired, and the current rotational direction is recorded.

Starting (M) the unlocking program includes the following steps: calculating (122) a rotational circumferential distance of the operation knob continuously rotational along the valid rotational direction and regarding the rotational circumferential distance of the operation knob continuously rotational along the valid rotational direction as the valid rotational circumferential distance, determining (123) whether the valid rotational circumferential distance reaches the preset circumferential distance, controlling (124) the electronic device to be unlocked in response to the valid rotational circumferential distance reaching the present circumferential distance, and returning to step (11) in response to the valid rotational circumferential distance not reaching the preset circumferential distance. That is, whether the rotational circumferential distance (the rotational circumferential distance of one rotation of the operation knob) of the operation knob rotational along the current rotational direction reaches the preset circumferential distance is calculated, the electronic device is controlled to unlock in response to the rotational circumferential distance of the operation knob rotational along the current rotational direction reaching the preset circumferential distance, or the method returns to step (11) in response to the rotational circumferential distance of the operation knob rotational along the current rotational direction not reaching the preset circumferential distance.

Figure 3:
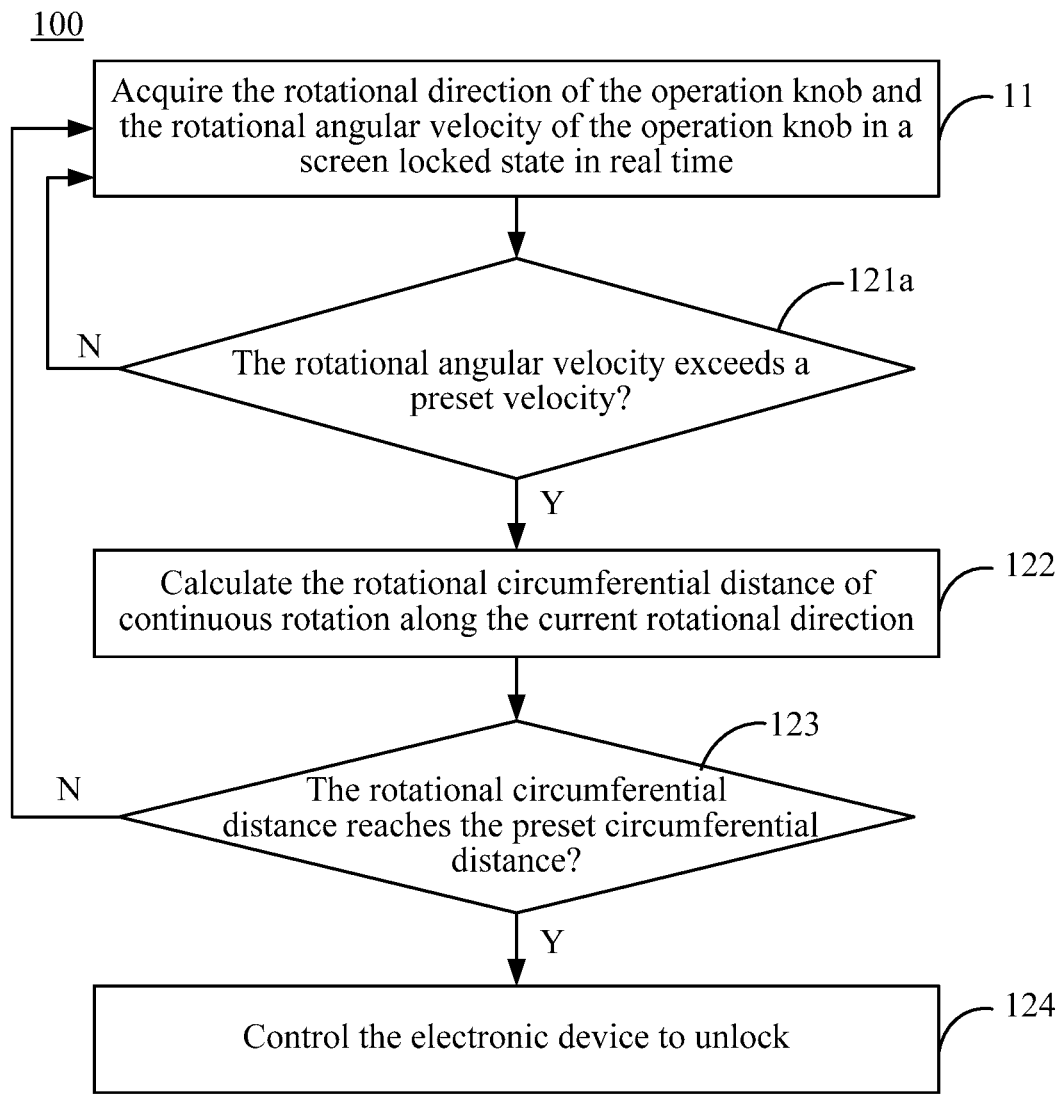
FIG. 3 is a flowchart of an unlocking method by using a knob according to embodiment three of the present application.

Referring to FIG. 3, based on the embodiment two, in embodiment three, a condition for starting the unlocking program includes: starting (121a) the unlocking program in response to the rotational angular velocity exceeding a preset velocity, and regarding the current rotational direction as the valid rotational direction. In an embodiment, the rotational angular velocity of the operation knob and the rotational direction of the operation knob are detected in real time, whether the rotational angular velocity is greater than or equal to the preset velocity (or greater than the preset velocity) is determined, and the unlocking program is started in response to the rotational angular velocity being greater or equal to the preset velocity (or greater than the preset velocity). The preset velocity is a velocity greater than 0. In this embodiment, to prevent the unlocking program from being started by an accidental touch, a large enough preset velocity needs to be selected. If the rotational direction of the operation knob suddenly changes, and the rotational angular velocity of the operation knob exceeds the preset velocity, the current rotational direction is renewed as the valid rotational direction, and the unlocking program is restarted according to the valid rotational direction.

Starting the unlocking program includes the following steps: calculating (122) a rotational circumferential distance of the operation knob continuously rotational along the current valid rotational direction and regarding the rotational circumferential distance of the operation knob continuously rotational along the current valid rotational direction as the valid rotational circumferential distance, determining (123) whether the valid rotational circumferential distance reaches the preset circumferential distance, controlling (124) the electronic device to unlock in response to the valid rotational circumferential distance reaching the preset circumferential distance, or returning to step (11) in response to the valid rotational circumferential distance not reaching the preset circumferential distance. That is, whether the rotational circumferential distance (the rotational circumferential distance of one rotation of the operation knob) of the operation knob rotational along the current rotational direction reaches the preset circumferential distance is calculated, the electronic device is controlled to unlock in response to the rotational circumferential distance of the operation knob rotational along the current rotational direction reaching the preset circumferential distance, or the method returns to step (11) in response to the rotational circumferential distance of the operation knob rotational along the current rotational direction not reaching the preset circumferential distance.

In an embodiment, the valid rotational circumferential distance is determined by one of: calculating a rotational circumferential distance of continuous rotation at a velocity greater than the preset velocity along the valid rotational direction and regarding the rotational circumferential distance of the continuous rotation at the velocity greater than the preset velocity along the valid rotational direction as the valid rotational circumferential distance. In an embodiment, calculating the valid rotational circumferential distance includes the following steps: in response to the rotational direction being valid, and the rotational angular velocity exceeding the preset velocity, calculating the rotational circumferential distance of the operation knob according to a rotational duration and the rotational angular velocity; in response to the rotational angular velocity not exceeding the preset velocity, stopping the calculation of the valid rotational circumferential distance, and returning to step (11); in response to changing the rotational direction, and the rotational angular velocity not exceeding the preset velocity, stopping the calculation of the valid rotational circumferential distance, and returning to step (11); or in response to changing the rotational direction, and the rotational angular velocity exceeding the preset velocity, regarding the changed rotational direction as the valid rotational direction, and restarting the unlocking program to recalculate the valid rotational circumferential distance.

Based on the embodiment three, in embodiment four, the valid rotational circumferential distance is determined in the following manner: regarding a rotational circumferential distance of rotation along the valid rotational direction within a preset time after the unlocking program is started as the valid rotational circumferential distance, where the rotational angular velocity exceeds the preset velocity. Specifically, calculating the valid rotational circumferential distance includes the following steps: performing the following operations within the preset time after the unlocking program is started, and timing begins: in response to the rotational direction being valid, and the rotational angular velocity exceeding the preset velocity, calculating the rotational circumferential distance of the operation knob according to the rotational duration and the rotational angular velocity; regarding the rotational circumferential distance accumulated within the preset time as the valid rotational circumferential distance; determining whether the valid rotational circumferential distance exceeds the preset circumferential distance in real time; unlocking the electronic device immediately in response to the valid rotational circumferential distance exceeding the preset circumferential distance; and returning to step (1) in response to the valid rotational circumferential distance not exceeding the preset circumferential distance when the preset time is over. When the rotational angular velocity does not exceed the preset velocity, the calculation of the current rotational circumferential distance is stopped temporarily until the rotational angular velocity is recovered. When the rotational direction changes, and the rotational angular velocity exceeds the preset velocity, the changed rotational direction is regarded as the valid rotational direction, and the unlocking program is restarted to recalculate the valid rotational circumferential distance.

Based on the embodiment three, in embodiment five, the valid rotational circumferential distance is determined in the following manner: regarding a rotational circumferential distance of rotation along the valid rotational direction after the unlocking program is started as the valid rotational circumferential distance, where the rotational angular velocity exceeds the preset velocity, and a halt time of the rotation does not exceed the preset time. In an embodiment, calculating the valid rotational circumferential distance includes the following steps: in response to the rotational direction being valid, and the rotational angular velocity exceeding the preset velocity, calculating the rotational circumferential distance of the operation knob according to the rotational duration and the rotational angular velocity; in response to the rotational angular velocity not exceeding the preset velocity (for example, the rotational angular velocity is 0, and the operation knob halts) and beginning timing, ending the unlocking program and returning to step (1) in response to the operation knob not recovering the condition that the rotational angular velocity exceeds the preset velocity and that the rotational direction is the valid rotational direction within the preset halt time, and continuously accumulating and calculating the rotational circumferential distance of the operation knob until the rotational circumferential distance reaches the preset circumferential distance in response to recovering the condition, and completing the unlocking work. If the rotational direction suddenly changes, and the rotational angular velocity exceeds the preset rotational angular velocity, the changed rotational direction is regarded as the valid rotational direction, and the unlocking program is restarted to recalculate the valid rotational circumferential distance. In this embodiment, the halt time refers to the time during which the rotational angular velocity of the operation knob is lower than the preset velocity. This embodiment supports unlocking by multiple consecutive rotations, and if a reverse low-velocity rotation is caused by a misoperation, the unlocking program is still running, thereby having lower requirements on operation concentration and action continuity of an operator, and allowing a user to give several consecutive turns with a few halts to unlock the electronic device, thus helping patients having visual impairment or finger nerve ending impairment to use the electronic device more easily.

Certainly, the halt time may also include the time during which the rotational angular velocity of the operation knob is 0 and lower than the preset velocity, and the rotational direction of the operation knob is the current valid rotational direction. In this case, if the rotational direction changes, whatever the rotational angular velocity is, a halt failure is indicated, and the method returns to step (11).

Based on the embodiment three, in embodiment six, the valid rotational circumferential distance is determined in the following manner: regarding a rotational circumferential distance of rotation along the valid rotational direction after the unlocking program is started as the valid rotational circumferential distance, where the halt time of the rotation does not exceed the preset halt time. In an embodiment, when the rotational direction is valid, and the rotational angular velocity is greater than 0, the rotational circumferential distance of the operation knob is calculated according to the rotational duration and the rotational angular velocity. When the rotational direction changes, or the rotational angular velocity is 0 (the operation knob halts), and timing begins, if the operation knob does not recover the condition that the rotational angular velocity does not exceed the preset velocity and that the rotational direction is the valid rotational direction within the preset halt time, the unlocking program is ended, and the method returns to step (11), and if the condition is recovered, the rotational circumferential distance of the operation knob is continuously accumulated and calculated until the rotational circumferential distance reaches the preset circumferential distance, and the unlocking work is completed. If the rotational direction suddenly changes, and the rotational angular velocity exceeds the preset rotational angular velocity, the changed rotational direction is regarded as the valid rotational direction, and the unlocking program is restarted to recalculate the valid rotational circumferential distance. In this embodiment, the halt time refers to the time during which the rotational angular velocity of the operation knob is 0. This embodiment supports unlocking by multiple consecutive rotations, thereby having lower requirements on operation concentration and action continuity of an operator, and allowing a user to give several consecutive turns with a few halts to unlock the electronic device, thus helping patients having visual impairment or finger nerve ending impairment to use the electronic device more easily.

Based on the embodiment three, in embodiment seven, the valid rotational circumferential distance is determined in the following manner: regarding a rotational circumferential distance of rotation along the valid rotational direction within a preset time after the unlocking program is started as the valid rotational circumferential distance. In an embodiment, the rotational direction and the rotational angular velocity are detected in real time, and timing begins, and the rotational circumferential distance of rotation along the valid rotational direction is calculated according to the rotational direction, the rotational duration and the rotational angular velocity; if the rotational circumferential distance reaches the preset circumferential distance within the preset time, the unlocking work is performed, and if the rotational circumferential distance does not reach the preset circumferential distance when the preset time is over, the method returns to step (11). In the process, if the rotational direction suddenly changes, and the rotational angular velocity exceeds the preset rotational angular velocity, the changed rotational direction is regarded as the valid rotational direction, and the unlocking program is restarted to recalculate the valid rotational circumferential distance.

During the rotation of the operation knob, one or any combination of the following situations is called discontinuous rotation of the operation knob: the rotational direction changes, the rotation suddenly halts, the rotational angular velocity is lower than the preset velocity during rotation, the rotation halt time exceeds the preset halt time or the time during which the rotational angular velocity is lower than the preset velocity exceeds the preset halt time, the rotational direction changes, and the rotational angular velocity exceeds the preset velocity. When one or any combination of these situations occurs, the current unlocking program is ended; and then depending on these situations, the method returns to step (11); or depending on these situations, the method returns to step (11), and the unlocking program is restarted.

Figure 4:
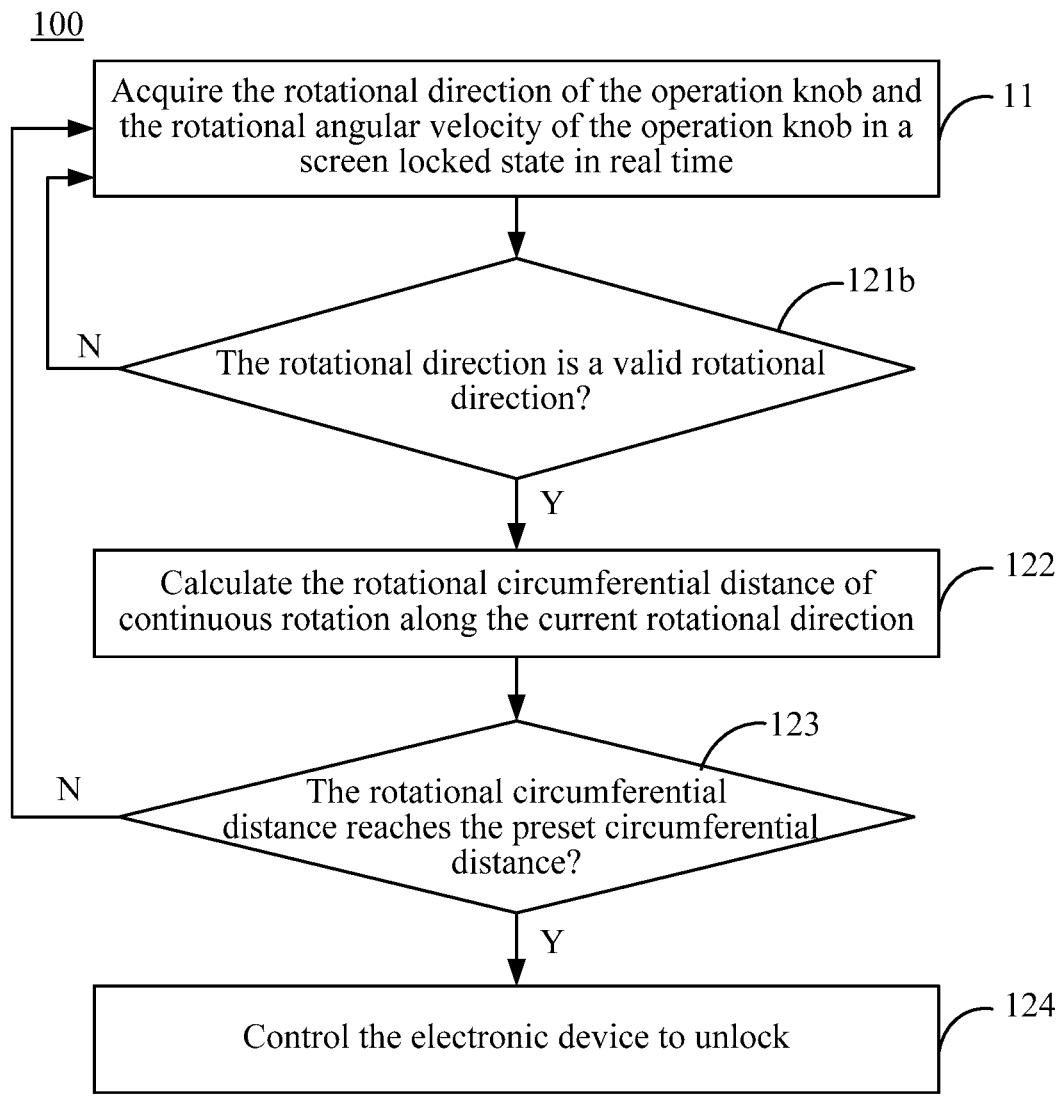
FIG. 4 is a flowchart of an unlocking method by using a knob according to embodiment eight of the present application.

Referring to FIG. 4, based on the embodiment two, in embodiment eight, a condition for starting the unlocking program includes: starting (121b) the unlocking program in response to the rotational direction of the operation knob being a preset valid rotational direction. In this embodiment, the valid rotational direction is the preset valid rotational direction. In an embodiment, clockwise or anticlockwise may be configured as the valid rotational direction, or clockwise and anticlockwise may be configured as the valid rotational directions simultaneously, the rotational angular velocity of the operation knob and the rotational direction of the operation knob are detected in real time, and when the operation knob rotates in the preset valid rotational directions, the unlocking program is started. For example, when clockwise or anticlockwise is configured as the valid rotational direction, whether the rotational angular velocity is greater than 0 is detected, and whether the rotational direction is clockwise or anticlockwise is detected, and if the rotational angular velocity is greater than 0, and the rotational direction is clockwise or anticlockwise, the unlocking program is started. When clockwise and anticlockwise are configured as the valid rotational directions simultaneously, whether the rotational angular velocity is greater than 0 is detected, and if the rotational angular velocity is greater than 0, the unlocking program is started, and the current rotational direction is recorded. If the rotational direction of the operation knob suddenly changes, and the changed rotational direction is the valid rotational direction, the valid rotational direction is rerecorded, the current unlocking program is ended, and the unlocking program is restarted. If the changed rotational direction is not the preset valid rotational direction, the current unlocking program is ended, and the method returns to step (11).

Starting (M) the unlocking program includes the following steps: calculating (122) a rotational circumferential distance of the operation knob continuously rotational along the current valid rotational direction and regarding the rotational circumferential distance of the operation knob continuously rotational along the current valid rotational direction as the valid rotational circumferential distance, determining (123) whether the valid rotational circumferential distance reaches the preset circumferential distance, controlling (124) the electronic device to unlock in response to the valid rotational circumferential distance reaching the preset circumferential distance, and returning to step (11) in response to the valid rotational circumferential distance not reaching the preset circumferential distance. That is, whether the rotational circumferential distance of the operation knob rotational along the current rotational direction (the rotational circumferential distance of one rotation of the operation knob) reaches the preset circumferential distance is calculated, and the electronic device is controlled to unlock in response to the rotational circumferential distance of the operation knob rotational along the current rotational direction reaching the preset circumferential distance, and the method returns to step (11) in response to the rotational circumferential distance of the operation knob rotational along the current rotational direction not reaching the preset circumferential distance.

In an embodiment, the valid rotational circumferential distance is determined in the following manner: calculating a rotational circumferential distance of continuous rotation along the current valid rotational direction and regarding the rotational circumferential distance of the continuous rotation along the current valid rotational direction as the valid rotational circumferential distance. In an embodiment, calculating the valid rotational circumferential distance includes the following steps: in response to the rotational direction being valid, and the rotational angular velocity being greater than 0, calculating the rotational circumferential distance of the operation knob according to the rotational duration and the rotational angular velocity; in response to the rotational angular velocity being 0, stopping the calculation of the valid rotational circumferential distance, and returning to step (11); in response to changing the rotational direction, stopping the calculation of the valid rotational circumferential distance, and returning to step (11), and starting the unlocking program according to the changed rotational direction, or not starting unlocking program according to the changed rotational direction. That is, when the rotational angular velocity is greater than 0, the rotational circumferential distance is continuously accumulated and calculated, and when the rotational angular velocity is less than or equal to 0 (the operation knob halts or changes the rotational direction), the current unlocking program is ended, and the method returns to step (11).

Based on the embodiment eight, in embodiment nine, the valid rotational circumferential distance is determined in the following manner: regarding a rotational circumferential distance of continuous rotation along the current valid rotational direction within the preset time after the unlocking program is started as the valid rotational circumferential distance. In an embodiment, calculating the valid rotational circumferential distance includes the following steps: performing the following operations within the preset time after the unlocking program is started, and timing begins: calculating the rotational circumferential distance of the operation knob rotational along the current rotational direction according to the rotational direction, the rotational duration and the rotational angular velocity; regarding the rotational circumferential distance accumulated within the preset time as the valid rotational circumferential distance; determining whether the valid rotational circumferential distance exceeds the preset circumferential distance in real time; unlocking the electronic device immediately in response to the valid rotational circumferential distance exceeding the preset circumferential distance; and returning to step (11) in response to the valid rotational circumferential distance not exceeding the preset circumferential distance when the preset time is over. If the rotational angular velocity becomes 0 within the preset time, the unlocking program continues without interruption until the preset time is over. When the rotational direction changes, and the rotational angular velocity exceeds the preset velocity, the current unlocking program is ended, the method returns to step (11), and the unlocking program is restarted according to the changed rotational direction, or the unlocking program is not restarted according to the changed rotational direction. That is, when the rotational angular velocity is greater than or equal to 0, the rotational circumferential distance is continuously accumulated and calculated within the preset time, and when the rotational angular velocity is less than 0 (the operation knob changes the rotational direction), the current unlocking program is ended, and the method returns to step (11).

Based on the embodiment eight, in embodiment ten, the valid rotational circumferential distance is determined in the following manner: regarding a rotational circumferential distance of rotation along the current valid rotational direction after the unlocking program is started as the valid rotational circumferential distance, where the halt time of the operation does not exceed the preset halt time. In an embodiment, calculating the valid rotational circumferential distance includes the following steps: in response to the rotational direction being the current valid rotational direction, calculating the rotational circumferential distance of the operation knob according to the rotational duration and the rotational angular velocity; in response to the rotational angular velocity being 0 and beginning timing, ending the unlocking program and returning to step (11) in response to the operation knob not resuming rotation within the preset halt time; continuously accumulating and calculating the rotational circumferential distance of the operation knob until the rotational circumferential distance reaches the preset circumferential distance in response to recovering the condition, and completing the unlocking work. If the rotational direction changes, the calculation of the valid circumferential distance is stopped, the method returns to step (11), and the unlocking program is restarted according to the changed rotational direction, or the unlocking program is not restarted according to the changed rotational direction. That is, when the rotational angular velocity is greater than 0, the rotational circumferential distance is continuously accumulated and calculated; and when the rotational angular velocity is 0, and timing begins, if the original rotational direction is recovered within the preset halt time, the rotational circumferential distance is continuously accumulated and calculated, and if the halt time exceeds the preset halt time, the current unlocking program is ended, and the method returns to step (11); and when the rotational angular velocity is less than 0, the current unlocking program is ended, and the method returns to step (11). In this embodiment, the halt time refers to the time during which the rotational angular velocity of the operation knob is 0. This embodiment supports unlocking by multiple consecutive rotations, thereby having lower requirements on operation concentration and action continuity of an operator, and allowing a user to give several consecutive turns with a few halts to unlock the electronic device, thus helping patients having visual impairment or finger nerve ending impairment to use the electronic device more easily.

During the rotation of the operation knob, one or any combination of the following situations is called discontinuous rotation of the operation knob: the rotational direction changes, the rotation suddenly halts, the rotational halt time exceeds the preset halt time. When one or any combination of these situations occurs, the current unlocking program is ended; and then depending on these situations, the method returns to step (11); or depending on these situations, the method returns to step (11), and the unlocking program is restarted.

Figure 5:
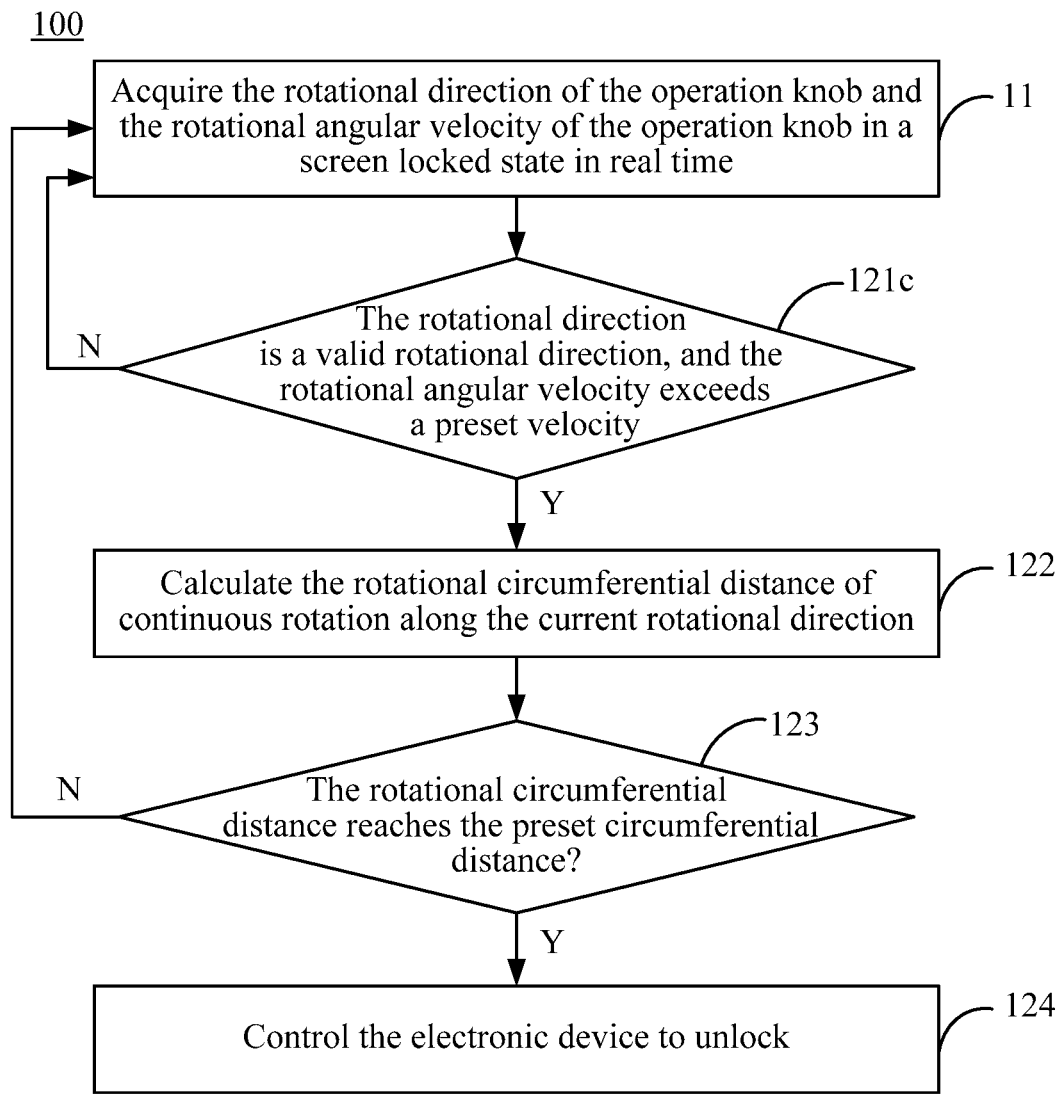
FIG. 5 is a flowchart of an unlocking method by using a knob according to embodiment eleven of the present application.

Referring to FIG. 5, based on the embodiment two, in embodiment eleven, starting the unlocking program includes: starting (121*c*) the unlocking program in response to the rotational direction of the operation knob being a preset valid rotational direction, and the rotational angular velocity exceeding the preset velocity. In this embodiment, the valid rotational direction is the preset valid rotational direction. In an embodiment, clockwise or anticlockwise may be configured as the valid rotational direction, or clockwise and anticlockwise may be configured as the valid rotational directions simultaneously, the rotational angular velocity of the operation knob and the rotational direction of the operation knob are detected in real time, and when the operation knob rotates in the preset valid rotational direction, and the rotational angular velocity exceeds the preset velocity, the unlocking program is started. For example, when clockwise or anticlockwise is configured as the valid rotational direction, whether the rotational angular velocity is greater than the preset velocity is detected, and whether the rotational direction is clockwise or anticlockwise is detected, and if the rotational angular velocity is greater than the preset velocity, and the rotational direction is clockwise or anticlockwise, the unlocking program is started. When clockwise and anticlockwise are configured as the valid rotational directions simultaneously, whether the rotational angular velocity is greater than the preset velocity is detected, and if the rotational angular velocity is greater than the preset velocity, the unlocking program is started, and the current rotational direction is recorded.

Starting (M) the unlocking program includes the following steps: calculating (122) a rotational circumferential distance of the operation knob continuously rotational along the current valid rotational direction and regarding the rotational circumferential distance of the operation knob continuously rotational along the current valid rotational direction as the valid rotational circumferential distance, determining (123) whether the valid rotational circumferential distance reaches the preset circumferential distance, controlling (124) the electronic device to be unlocked in response to the valid rotational circumferential distance reaching the preset circumferential distance, and returning to step (11) in response to the valid rotational circumferential distance not reaching the preset circumferential distance.

That is, whether the rotational circumferential distance of the operation knob rotational along the current rotational direction (the rotational circumferential distance of one rotation of the operation knob) reaches the preset circumferential distance is calculated, and the electronic device is controlled to unlock in response to the rotational circumferential distance of the operation knob rotational along the current rotational direction reaching the preset circumferential distance, and the method returns to step (11) in response to the rotational circumferential distance of the operation knob rotational along the current rotational direction not reaching the preset circumferential distance.

In an embodiment, the valid rotational circumferential distance is determined in the following manner: calculating a rotational circumferential distance of continuous rotation at a velocity greater than the preset velocity along the current valid rotational direction and regarding the rotational circumferential distance of the continuous rotation at the velocity greater than the preset velocity along the current valid rotational direction as the valid rotational circumferential distance. In an embodiment, calculating the valid rotational circumferential distance includes the following steps: in response to the rotational direction being the current valid rotational direction, and the rotational angular velocity exceeding the preset velocity, calculating the rotational circumferential distance of the operation knob according to the rotational duration and the rotational angular velocity; in response to the rotational angular velocity not exceeding the preset velocity, stopping the calculation of the valid rotational circumferential distance, and returning to step (11); in response to changing the rotational direction, and the rotational angular velocity not exceeding the preset velocity, stopping the calculation of the valid rotational distance, and returning to step (11); in response to changing the rotational direction, and the rotational angular velocity exceeding the preset velocity, stopping the calculation of the valid rotational distance, and returning to step (11); and determining whether the changed rotational direction is the valid rotational direction, and restarting the unlocking program to recalculate the valid rotational circumferential distance in response to the changed rotational direction being the valid rotational direction.

Based on the embodiment eleven, in embodiment twelve, the valid rotational circumferential distance is determined in the following manner: regarding a rotational circumferential distance of rotation along the current valid rotational direction within a preset time after the unlocking program is started as the valid rotational circumferential distance, where the rotational angular velocity exceeds the preset velocity. In an embodiment, calculating the valid rotational circumferential distance includes the following steps: performing the following operations within the preset time after the unlocking program is started, and timing begins: in response to the rotational direction being the current valid rotational direction, and the rotational angular velocity exceeding the preset velocity, calculating the rotational circumferential distance of the operation knob according to the rotational duration and the rotational angular velocity; regarding the rotational circumferential distance accumulated within the preset time as the valid rotational circumferential distance; determining whether the valid rotational circumferential distance exceeds the preset circumferential distance in real time; unlocking the electronic device immediately in response to the valid rotational circumferential distance exceeding the preset circumferential distance; and returning to step (11) in response to the valid rotational circumferential distance not exceeding the preset circumferential distance when the preset time is over. When the rotational angular velocity does not exceed the preset velocity, the calculation of the current rotational circumferential distance is stopped temporarily until the rotational angular velocity is recovered. When the rotational direction changes, and the rotational angular velocity exceeds the preset velocity, the calculation of the rotational circumferential distance is stopped, and the method returns to step (11); whether the changed rotational direction is the valid rotational direction is determined, and if the changed rotational direction is the valid rotational direction, the unlocking program is restarted to recalculate the valid rotational circumferential distance.

Based on the embodiment eleven, in embodiment thirteen, the valid rotational circumferential distance is determined in the following manner: regarding a rotational circumferential distance of rotation along the current valid rotational direction after the unlocking program is started as the valid rotational circumferential distance, where the rotational angular velocity exceeds the preset velocity, and the halt time of the rotation does not exceed the preset time. In an embodiment, calculating the valid rotational circumferential distance includes the following steps: in response to the rotational direction being valid, and the rotational angular velocity exceeding the preset velocity, calculating the rotational circumferential distance of the operation knob according to the rotational duration and the rotational angular velocity; in response to the rotational angular velocity not exceeding the preset velocity (for example, the rotational angular velocity is 0, and the operation knob halts), and beginning timing, ending the unlocking program, and returning to step (11) in response to the operation knob not recovering the condition that the rotational angular velocity exceeds the preset velocity and that the rotational direction is the valid rotational direction within the preset halt time; and continuously accumulating and calculating the rotational circumferential distance of the operation knob until the rotational circumferential distance reaches the preset circumferential distance in response to recovering the condition, and completing the unlocking work. If the rotational direction suddenly changes, and the rotational angular velocity exceeds the preset rotational angular velocity, the calculation of the valid rotational circumferential distance is stopped, and the method returns to step (11); whether the changed rotational direction is the valid rotational direction is determined, and if the changed rotational direction is the valid rotational direction, the unlocking program is restarted to recalculate the valid rotational circumferential distance. In this embodiment, the halt time refers to the time during which the rotational angular velocity of the operation knob is lower than the preset velocity. This embodiment supports unlocking by multiple consecutive rotations, and if a reverse low-velocity rotation is caused by a misoperation, the unlocking program is still running, thereby having lower requirements on operation concentration and action continuity of an operator, and allowing a user to give several consecutive turns with a few halts to unlock the electronic device, thus helping patients having visual impairment or finger nerve ending impairment to use the electronic device more easily.

Certainly, the halt time may also include the time during which the rotational angular velocity of the operation knob is 0 and lower than the preset velocity, and the rotational direction of the operation knob is the current valid rotational direction. In this case, if the rotational direction changes, whatever the rotational angular velocity is, a halt failure is indicated, and the method returns to step (11).

Based on the embodiment eleven, in embodiment fourteen, the valid rotational circumferential distance is determined in the following manner: regarding a rotational circumferential distance of rotation along the current valid rotational direction after the unlocking program is started as the valid rotational circumferential distance, where the halt time of the rotation does not exceed the preset halt time. In an embodiment, when the rotational direction is valid, and the rotational angular velocity is greater than 0, the rotational circumferential distance of the operation knob is calculated according to the rotational duration and the rotational angular velocity; when the rotational direction changes, or the rotational angular velocity is 0 (the operation knob halts), and timing begins, if the operation knob does not recover the condition that the rotational angular velocity does not exceed the preset velocity and that the rotational direction is the valid rotational direction within the preset halt time, the unlocking program is ended, and the method returns to step (11); and if the condition is recovered, the rotational circumferential distance of the operation knob is continuously accumulated and calculated until the rotational circumferential distance reaches the preset circumferential distance, and the unlocking work is completed. If the rotational direction suddenly changes, and the rotational angular velocity exceeds the preset rotational angular velocity, the method returns to step (11). In this embodiment, the halt time refers to the time during which the rotational angular velocity of the operation knob is 0. This embodiment supports unlocking by multiple consecutive rotations, thereby having lower requirements on operation concentration and action continuity of an operator, and allowing a user to give several consecutive turns with a few halts to unlock the electronic device, thus helping patients having visual impairment or finger nerve ending impairment to use the electronic device more easily.

Based on the embodiment eleven, in embodiment fifteen, the valid rotational circumferential distance is determined in the following manner: regarding a rotational circumferential distance of rotation along the current valid rotational direction within the preset time after the unlocking program is started as the valid rotational circumferential distance. In an embodiment, the rotational direction and the rotational angular velocity are detected in real time, and timing begins, and the rotational circumferential distance of the rotation along the current valid rotational direction is calculated according to the rotational direction, the rotational duration and the rotational angular velocity; if the rotational circumferential distance reaches the preset circumferential distance within the preset time, the unlocking work is performed; and if the rotational circumferential distance does not reach the preset circumferential distance when the preset time is over, the method returns to step (11). In the process, if the rotational direction suddenly changes, and the rotational angular velocity exceeds the preset rotational angular velocity, the method returns to step (11).

During the rotation of the operation knob, one or any combinations of the following situation is called discontinuous rotation of the operation knob: the rotational direction changes, the rotation suddenly halts, the rotational angular velocity is lower than the preset velocity during rotation, the rotation halt time exceeds the preset halt time or the time during which the rotational angular velocity is lower than the preset velocity exceeds the preset halt time, the rotational direction changes and the rotational angular velocity exceeds the preset velocity. When one or any combination of these situations occurs, the current unlocking program is ended; and then depending on these situations, the method returns to step (11); or depending on these situations, the method returns to step (11), and the unlocking program is restarted.

In the preceding embodiment, the preset time is 1 second, the preset halt time is 0.5 seconds, and the preset circumferential distance is a circumferential distance of 60 degrees. Certainly, other values may also be selected for the preset halt time, the preset time and the preset circumferential distance respectively.

Figure 6:
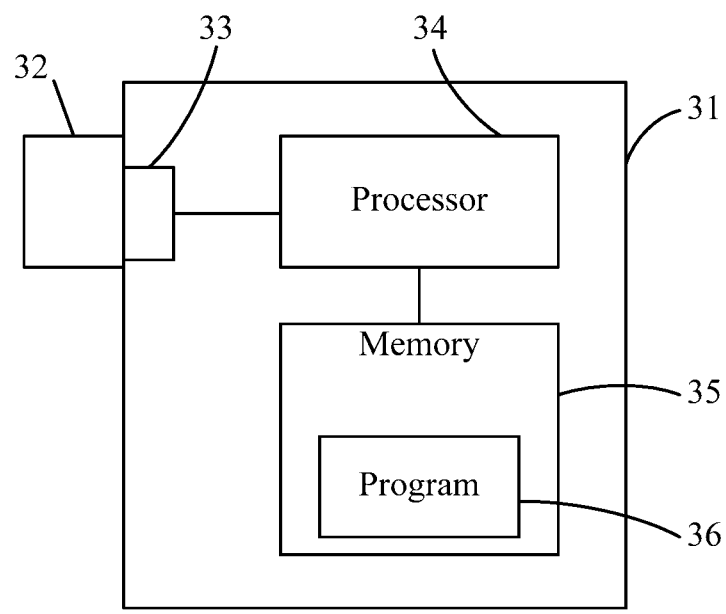
FIG. 6 is a block diagram of an electronic device capable of being unlocked by using a knob in the present application.

Referring to FIG. 6, the present application further provides an electronic device 200 capable of being unlocked by using a knob. The electronic device 200 includes a host 31, an operation knob 32 rotatably mounted on the host 31, one or more processors 34, a memory 35, and one or more programs 36. The one or more programs 36 are stored in the memory and configured to be executed by the one or more processors. The one or more programs include instructions for executing the preceding unlocking method 100 by using a knob.

The electronic device 200 further includes a photosensor 33. In the one or more programs, the rotational direction of the operation knob 32 and the rotational angular velocity of the operation knob 32 are acquired by using the photosensor 33, and the rotational circumferential distance of the operation knob 32 is calculated according to the rotational direction, the rotational duration and the rotational angular velocity.

In an embodiment, the photosensor 33 includes a laser light source unit and an image detection unit. The laser light source unit is configured to emit weak laser light on a surface of the operation knob 32, and the image detection unit is configured to determine the rotational direction of the operation knob 32 and the rotational angular velocity of the operation knob 32 by using light reflected by the surface of the operation knob 32.

Figure 7D:
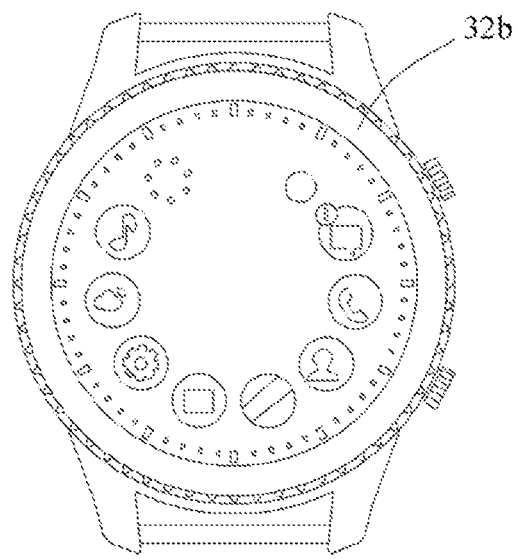
FIG. 7d is a view illustrating the structure of a smart watch that is the electronic device capable of being unlocked by using a knob.

Referring to FIGS. 7a to 7d, the electronic device may be a watch (as shown in FIGS. 7a to 7d). The watch may be an ordinary watch or an electronic watch. The operation knob may be the crown 32a of the watch (as shown in FIG. 7a) or the bezel 32c disposed around the dial of the watch (as shown in FIG. 7d).

Figure 8:
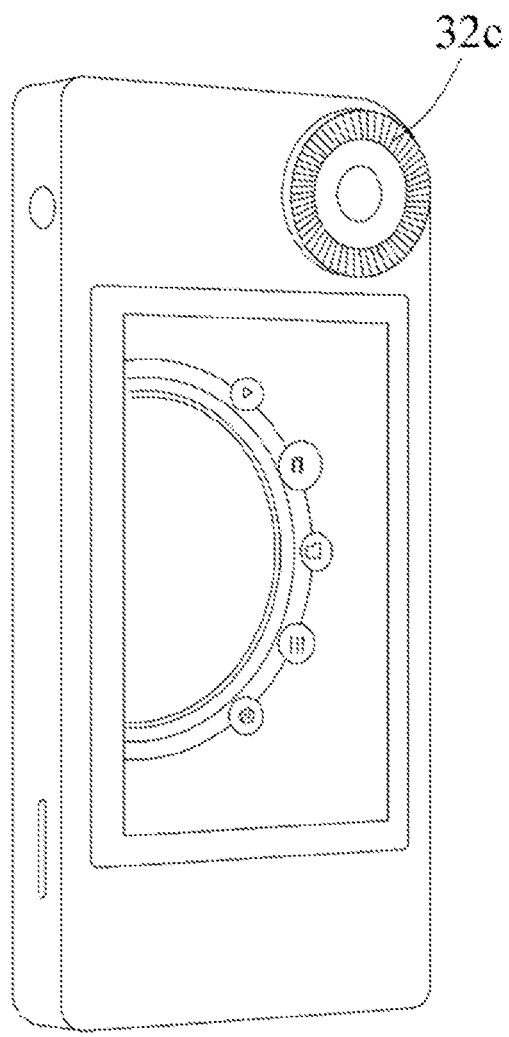
FIG. 8 is a view illustrating the structure of a camera that is the electronic device capable of being unlocked by using a knob.

Referring to FIG. 8, the electronic device may be a camera, and the operation knob may be the dial 32c on the camera.

Figure 9:
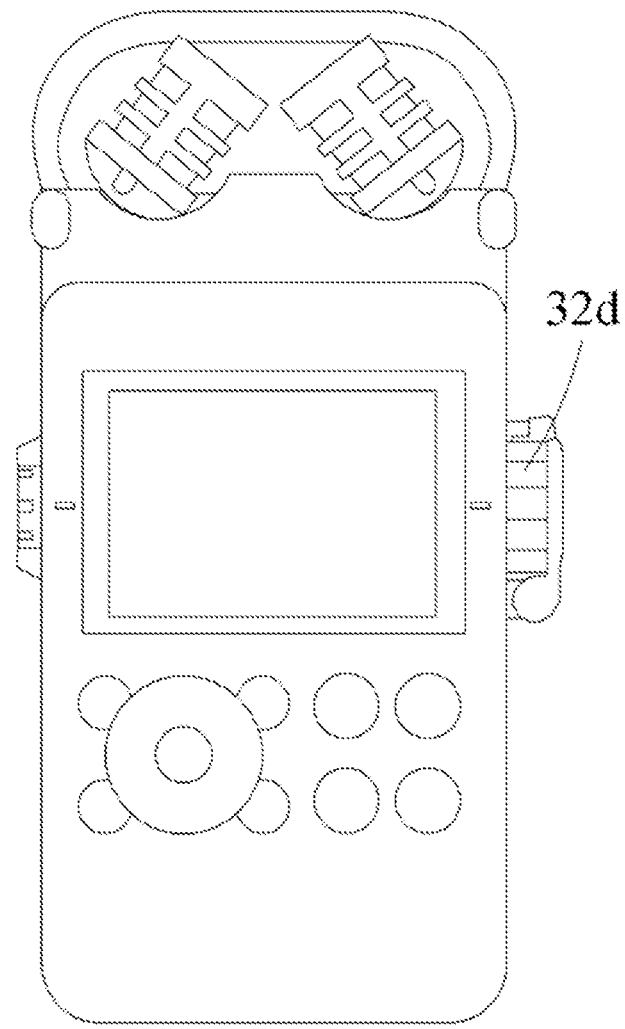
FIG. 9 is a view illustrating the structure of a recording device that is the electronic device capable of being unlocked by using a knob.

Referring to FIG. 9, the electronic device may be a recording device, and the operation knob may be a volume knob 32d. Certainly, the electronic device may also be a walkman (not shown) or another electronic device whose interface needs to be locked to prevent a misoperation.

The preceding embodiments disclosed are only the preferred embodiments of the present application and certainly cannot be used for limiting the scope of claims of the present application. Therefore, the equivalent changes made according to the patent scope of the present application still fall within the scope of the present application.

What is claimed is:

1. A unlocking method by using a knob, applied to an electronic device which is provided with an operation knob, comprising:
   step (1): detecting an action of the operation knob in a screen locked state in real time; and
   step 2: starting an unlocking program in response to rotation of the operation knob: calculating a rotational circumferential distance of the operation knob along a current rotational direction, determining whether the rotational circumferential distance of the operation knob reaches a preset circumferential distance, controlling the electronic device to unlock in response to the rotational circumferential distance of the operation knob reaching the preset circumferential distance, or unlocking failed and returning to step (1) in response to the rotational circumferential distance of the operation knob not reaching the preset circumferential distance; wherein step (1) comprises acquiring a rotational direction of the operation knob and a rotational angular velocity of the operation knob in the screen locked state in real time, and wherein step (2) comprises: starting the unlocking program in response to the rotational direction of the operation knob meeting a preset range and/or the rotational angular velocity of the operation knob meeting a preset range.

2. The unlocking method by using a knob according to claim 1, wherein the starting the unlocking program comprises one of:
in response to the rotational angular velocity exceeding a preset velocity, starting the unlocking program and regarding a current rotational direction as a valid rotational direction;
in response to the rotational direction of the operation knob being a preset valid rotational direction, starting the unlocking program; or
in response to the rotational direction of the operation knob being the preset valid rotational direction and the rotational angular velocity exceeding the preset velocity, starting the unlocking program.

3. The unlocking method by using a knob according to claim 2, wherein starting the unlocking program comprises: calculating a rotational circumferential distance of continuous rotation along the valid rotational direction and regarding the rotational circumferential distance of the continuous rotation along the valid rotational direction as a valid rotational circumferential distance, determining whether the valid rotational circumferential distance reaches the preset circumferential distance, controlling the electronic device to be unlocked in response to the valid rotational circumferential distance reaching the preset circumferential distance, or returning to step (1) in response to the valid rotational circumferential distance not reaching the preset circumferential distance.

4. The unlocking method by using a knob according to claim 3, wherein the valid rotational circumferential distance is determined by one of:
calculating a rotational circumferential distance of continuous rotation at a velocity greater than the preset velocity along a current valid rotational direction and regarding the rotational circumferential distance of the continuous rotation at the velocity greater than the preset velocity along the current valid rotational direction as the valid rotational circumferential distance;
regarding a rotational circumferential distance of rotation along the current valid rotational direction within a preset time after the unlocking program is started as the valid rotational circumferential distance, wherein the rotational angular velocity exceeds the preset velocity;
regarding a rotational circumferential distance of rotation along the current valid rotational direction after the unlocking program is started as the valid rotational circumferential distance, wherein the rotational angular velocity exceeds the preset velocity, and a halt time of the rotation does not exceed a preset halt time;
regarding a rotational circumferential distance of rotation along the current valid rotational direction after the unlocking program is started as the valid rotational circumferential distance, wherein the a halt time of the rotation does not exceed the preset halt time; or
regarding a rotational circumferential distance of rotation along the current valid rotational direction within a preset time after the unlocking program is started as the valid rotational circumferential distance.

5. The unlocking method by using a knob according to claim 1, comprising:
acquiring a rotational direction of the operation knob and a rotational angular velocity of the operation knob by using a photosensor, and
calculating the rotational circumferential distance of the operation knob according to the rotational direction, a rotational duration and the rotational angular velocity.

6. The unlocking method by using a knob according to claim 5, wherein the photosensor comprises a laser light source unit and an image detection unit, the laser light source unit is configured to emit weak laser light on a surface of the operation knob, and the image detection unit is configured to determine the rotational direction of the operation knob and the rotational angular velocity of the operation knob according to light reflected by the surface of the operation knob.

7. The unlocking method by using a knob according to claim 1, wherein the starting an unlocking program in step (2) further comprises:
displaying an unlock picture on a screen of the electronic device, wherein the unlock picture comprises an arced progress bar corresponding to the preset circumferential distance;
synchronously filling the progress bar according to a rotational direction of the operation knob and a rotational angular velocity of the operation knob; and
canceling the unlock picture in response to an unlocking failure.

8. The unlocking method by using a knob according to claim 7, wherein an unlock pattern is displayed at an end of the arced progress bar.

9. The method for unlocking by use of a knob according to claim 1, wherein after the electronic device is unlocked, the method comprises:
omitting a rotation signal of the operation knob detected within a preset time after the electronic device is unlocked, or omitting rotation signals of the operation knob for preset first several times.

10. The unlocking method by using a knob according to claim 1, wherein the electronic device is a watch, a camera, a walkman or a recording device.

11. The unlocking method by using a knob according to claim 1, wherein the electronic device is a watch, and the operation knob is a crown of the watch or a bezel disposed around a dial of the watch.

12. An electronic device capable of being unlocked by using a knob, comprising a host, an operation knob rotatably mounted on the host, one or more processors, a memory, and one or more programs, wherein the one or more programs are stored in the memory and configured to be executed by the one or more processors, and the one or more programs comprise instructions for executing:
step (1): detecting an action of the operation knob in a screen locked state in real time; and
step 2: starting an unlocking program in response to rotation of the operation knob: calculating a rotational circumferential distance of the operation knob along a current rotational direction, determining whether the rotational circumferential distance of the operation knob reaches a preset circumferential distance, controlling the electronic device to unlock in response to the rotational circumferential distance of the operation knob reaching the preset circumferential distance, or unlocking failed and returning to step (1) in response to the rotational circumferential distance of the operation knob not reaching the preset circumferential distance; wherein step (1) comprises acquiring a rotational direction of the operation knob and a rotational angular velocity of the operation knob in the screen locked state in real time, and wherein step (2) comprises: starting the unlocking program in response to the rotational direction of the operation knob meeting a preset range and/or the rotational angular velocity of the operation knob meeting a preset range.

13. The electronic device according to claim 12, comprising:
acquiring a rotational direction of the operation knob and a rotational angular velocity of the operation knob by using a photosensor, and
calculating the rotational circumferential distance of the operation knob according to the rotational direction, a rotational duration and the rotational angular velocity.

14. The electronic device according to claim 13, wherein the photosensor comprises a laser light source unit and an image detection unit, the laser light source unit is configured to emit weak laser light on a surface of the operation knob, and the image detection unit is configured to determine the rotational direction of the operation knob and the rotational angular velocity of the operation knob according to light reflected by the surface of the operation knob.

15. A non-transitory computer-readable storage medium comprising a computer program applied in conjunction with an electronic device having an operation knob, wherein the computer program is executable by a processor to cause the processor to implement:
step (1): detecting an action of the operation knob in a screen locked state in real time; and
step 2: starting an unlocking program in response to rotation of the operation knob: calculating a rotational circumferential distance of the operation knob along a current rotational direction, determining whether the rotational circumferential distance of the operation knob reaches a preset circumferential distance, controlling the electronic device to unlock in response to the rotational circumferential distance of the operation knob reaching the preset circumferential distance, or unlocking failed returning to step (1) in response to the rotational circumferential distance of the operation knob not reaching the preset circumferential distance; wherein step (1) comprises acquiring a rotational direction of the operation knob and a rotational angular velocity of the operation knob in the screen locked state in real time, and wherein step (2) comprises: starting the unlocking program in response to the rotational direction of the operation knob meeting a preset range and/or the rotational angular velocity of the operation knob meeting a preset range.

16. The electronic device according to claim 15, wherein the starting the unlocking program comprises one of:
in response to the rotational angular velocity exceeding a preset velocity, starting the unlocking program and regarding a current rotational direction as a valid rotational direction;
in response to the rotational direction of the operation knob being a preset valid rotational direction, starting the unlocking program; or
in response to the rotational direction of the operation knob being the preset valid rotational direction and the rotational angular velocity exceeding the preset velocity, starting the unlocking program.

17. The electronic device according to claim 16, wherein starting the unlocking program comprises: calculating a rotational circumferential distance of continuous rotation along the valid rotational direction and regarding the rotational circumferential distance of the continuous rotation along the valid rotational direction as a valid rotational circumferential distance, determining whether the valid rotational circumferential distance reaches the preset circumferential distance, controlling the electronic device to be unlocked in response to the valid rotational circumferential distance reaching the preset circumferential distance, or returning to step (1) in response to the valid rotational circumferential distance not reaching the preset circumferential distance.

18. The electronic device according to claim 17, wherein the valid rotational circumferential distance is determined by one of:
calculating a rotational circumferential distance of continuous rotation at a velocity greater than the preset velocity along a current valid rotational direction and regarding the rotational circumferential distance of the continuous rotation at the velocity greater than the preset velocity along the current valid rotational direction as the valid rotational circumferential distance;
regarding a rotational circumferential distance of rotation along the current valid rotational direction within a preset time after the unlocking program is started as the valid rotational circumferential distance, wherein the rotational angular velocity exceeds the preset velocity;
regarding a rotational circumferential distance of rotation along the current valid rotational direction after the unlocking program is started as the valid rotational circumferential distance, wherein the rotational angular velocity exceeds the preset velocity, and a halt time of the rotation does not exceed a preset halt time;
regarding a rotational circumferential distance of rotation along the current valid rotational direction after the unlocking program is started as the valid rotational circumferential distance, wherein the a halt time of the rotation does not exceed the preset halt time; or
regarding a rotational circumferential distance of rotation along the current valid rotational direction within a preset time after the unlocking program is started as the valid rotational circumferential distance.

* * * * *